(12) United States Patent
Wilhelmsson (10) Patent No.: US 7,613,262 B2
(45) Date of Patent: Nov. 3, 2009

(54) SIGNAL PROCESSING APPARATUS AND METHOD FOR DECISION DIRECTED SYMBOL SYNCHRONISATION

(75) Inventor: Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 603 days.

(21) Appl. No.: 10/542,256

(22) PCT Filed: Dec. 16, 2003

(86) PCT No.: PCT/EP03/14486

§ 371 (c)(1),
(2), (4) Date: Feb. 21, 2006

(87) PCT Pub. No.: WO2004/066549

PCT Pub. Date: Aug. 5, 2004

(65) Prior Publication Data

US 2007/0211831 A1 Sep. 13, 2007

Related U.S. Application Data

(60) Provisional application No. 60/441,424, filed on Jan. 21, 2003.

(30) Foreign Application Priority Data

Jan. 17, 2003 (EP) .................. 03388003

(51) Int. Cl.
*H04L 7/00* (2006.01)
(52) U.S. Cl. ..................... 375/355
(58) Field of Classification Search ................. 375/355, 375/233

See application file for complete search history.

(56) References Cited

U.S. PATENT DOCUMENTS 5,483,555 A * 1/1996 Hattori ....................... 375/327
5,675,565 A * 10/1997 Taguchi et al. ........... 369/47.35
5,761,211 A * 6/1998 Yamaguchi et al. ......... 714/707

(Continued)

FOREIGN PATENT DOCUMENTS

WO 97/03507 A1 1/1997

OTHER PUBLICATIONS

Mueller, K.H. et al.: "Timing Recovery in Digital Synchronous Data Receivers" IEEE Transactions on Communications, IEEE Inc., New York, US, vol. 24, No. 5, May 1, 1976, pp. 516-531, XP000573328, ISSN: 0090-6778.

Roo, P. et al.: "Analog Timing Recovery Architectures for PRML Detectors" Globecom '95. IEEE Global Telecommunications Conference, Singapore, Nov. 14-16, 1995, IEEE Global Telecommunications Conference (Globecom), New York, IEEE, US, vol. 1, Nov. 14, 1995, pp. 571-576, XP000621549, ISBN: 0-7803-2510-9.

(Continued)

*Primary Examiner*—Kevin Y Kim
(74) *Attorney, Agent, or Firm*—Potomac Patent Group PLLC (57) ABSTRACT

A signal processing apparatus (400;800) comprising: a demodulator (e.g. a PSK demodulator) (407;900) arranged to demodulate a received signal, which carries consecutive symbols ($a_1, \ldots, a_4$) at a symbol rate, wherein the demodulator (407;900) is arranged, based on sample values of the received signal, to calculate an error value ($\phi_m$) of a given symbol relative to a decision-directed determination of an expected symbol value (I); and a phase-shifter (406,409;801; 1002,1013) arranged to shift the phase of sampling points in time at which points in time, sample values of the received signal is provided to the demodulator (407;1000). The invention is characterized in that the apparatus (400;900) comprises a processor (408;601;1000) arranged to evaluate an error metric ($\tau$), at the symbol rate, for a given symbol as a function of the error value ($\phi$) and symbol values (II), and to determine whether to shift the phase of the sampling points in time based on further evaluation of the error metric ($\tau$). Thereby an optimal sampling instant can be provided based on estimation of Inter Symbol Interference.

17 Claims, 7 Drawing Sheets

U.S. PATENT DOCUMENTS

| | | | |
|---|---|---|---|
| 5,859,671 A * | 1/1999 | Kim | 348/537 |
| 6,295,325 B1 * | 9/2001 | Farrow et al. | 375/327 |
| 6,707,861 B1 * | 3/2004 | Stewart | 375/321 |
| 6,901,146 B1 * | 5/2005 | Taura et al. | 381/3 |
| 6,985,549 B1 * | 1/2006 | Biracree et al. | 375/355 |

OTHER PUBLICATIONS

PCT International Search Report, mailed May 19, 2004, in connection with International Application No. PCT/EP2003/14486.

* cited by examiner

SIGNAL PROCESSING APPARATUS AND METHOD FOR DECISION DIRECTED SYMBOL SYNCHRONISATION

This application claims the benefit of the filing date of U.S. Provisional Patent Application No. 60/441,424 filed on Jan. 21, 2003, and claims priority from European Patent Application No. 03388003.0 filed on Jan. 17, 2003. This application is a U.S. national stage application of International Application No. PCT/EP2003/014486.

This invention relates to a signal processing apparatus comprising: a demodulator arranged to demodulate a received signal, which carries consecutive symbols, wherein the demodulator is arranged, based on sample values of the received signal, to calculate an error value of a received symbol value relative to a decision-directed determination of an expected symbol value and a reference value, wherein the reference value is calculated, based on a calculated error value of previously received symbols; and a phase-shifter arranged to shift the phase of sampling points in time, at which points in time sample values of the received signal is provided to the demodulator.

Typically, a demodulator finds its application in communications equipment where devices are capable of communicating over a communications channel by establishing a communications link. When the devices, all the way through the communications link or at intermediate portions of the communications link, operate on digital data, the term digital communications is typically used to designate the technical field.

In digital communications in general and in wireless communications in particular, the data to be communicated are typically transmitted in bursts. For instance, in the case a communications channel is shared by several devices using time division multiple multiplex (TDMA), each user obtains access to the communications channel during time slots, during which a packet of data is transmitted. This type of multiple access is used for instance in the cellular communications system Global System for Mobile communications, GSM, and in the near range communications system Bluetooth™. Both of these systems are digital communications systems.

In all types of systems, the transmitter and the receiver must be synchronized in time. In digital communications, however, this synchronization can be divided into two categories; i.e. frame synchronization and bit synchronization. On the one hand, frame synchronization essentially refers to knowing where a packet of data starts, and is achieved by transmitting a known sequence of data along with the data that it is intended to transmit, i.e. the so-called payload data. The known sequence of data is often referred to as a so-called SYNCWORD, but other terms are used like FRAME DELIMITER, etc. On the other hand, bit synchronization refers to what sampling instant is used to make a decision on the symbols within the packet of data. It should be noted that a symbol typically represents one or several bits (typically 1-3 (4) bits). On a so-called physical layer of the communications link, the symbols are represented by (analogue) amplitude and/or phase values of an electromagnetic signal. Hence, in bringing these values into a digital domain, the signals must be quantified by sampling the signal to provide samples of the signal that can be converted into digital values. The—substantially periodically occurring—points in time at which the signal is sampled are often denoted the sampling instant. Bit synchronisation is an important issue in that synchronisation of this sampling instant is crucial in extracting symbol values and thus data from the electromagnetic signal. Bit synchronisation can essentially be carried out in one of three ways.

Firstly, it can be carried out by the aid of a known sequence. This is referred to as data aided (DA) estimation. This gives good results, but comes at the cost of the need to transmit more bits.

Secondly, it can be carried out in a decision directed (DD) fashion. This means that a decision on the received data is to be made, and then estimation as if such decisions were correct shall be carried out. In case the decisions are in fact correct, the performance would be the same as for the data aided estimator, but without the need for transmitting the extra bits. A problem with decision directed estimation arises when the decisions are erroneous, since then the performance of a decision directed estimator is degraded considerably.

Thirdly, one can use non-data aided (NDA) estimation. In this type of estimators, the effect of the actual data is typically removed by some type of (non-linear) function. One example of this is tat, in case the modulation is M-ary phase shift keying (M-PSK), then the actual data can be removed by taking the received signal to the Mth power. The drawback of non-data aided estimation is that the operation required removing the actual data results in noise enhancement, thus yielding a worse performance than data aided estimation.

In the following, the estimation is decision directed. The reason simply being that in many systems no known data are available, that there is a high probability that the decisions are correct, and even if some decisions would be erroneous, this is believed to only cause a graceful degradation of the performance rather than causing the algorithms to completely fail to function.

To further describe the background of the invention, consider the situation that both frame synchronisation and bit synchronisation have been achieved, but where it is desirable to improve the bit synchronisation. There are two different reasons why this may be the case. Firstly, the original bit synchronisation may not have been good enough. Secondly, throughout the reception of the packet, time-drift may have caused the originally chosen sampling instant to no longer be optimal. In either of these cases, it is desirable to update the used sampling phase in order to improve the performance of the overall communications system and in particular a receiver.

Since the performance of a system can be severely degraded in case a non-optimal sampling instant is used, the problem of adjusting the used sampling instant is not new, but has been worked on by others.

WO 97/03507 discloses a method and an apparatus for recovering a timing phase and frequency of a sampling clock signal in a receiver. This is based on minimizing a mean squared error due to un-cancelled precursor inter symbol interference; a precursor is a sample that is located one sample (corresponding to one symbol) ahead of an optimum sampling instant of a given symbol and which value, ideally, is not affected by the impulse representing the given symbol. A detected symbol error is correlated with a signal obtained from the received signal. This correlation function provides an approximate of the time instant where the mean squared error approaches its minimum at which point an unambiguous zero crossing of the correlation function is obtained. From this zero crossing a desired sampling instant is determined. A decision feedback equalizer (DFE) implements this recovery of the sampling phase/frequency.

However, this involves a high computational effort in that embodiments of this timing recovery principle requires calculation of the correlation function, AG, for each received symbol pulse to provide a phase adjustment signal.

Hence, the prior art involves the problem that an excessive computational effort is required for the prior art principle to work. Additionally, delay elements and filter coefficients of the equalizer occupy critical circuit space. Moreover, precise identification of the zero crossing can be critical when realistic noise levels are present in the received signal.

It is therefore an object of the present invention to provide a method and an apparatus of low complexity that accomplish the above-mentioned adjustment of the sampling phase.

The above and other problems are solved when the signal processing apparatus mentioned in the opening paragraph is characterized in comprising a processor arranged to evaluate an error metric, at the symbol rate, for a given symbol as a function of the error value and symbol values, and to determine whether to shift the phase of the sampling points in time based on further evaluation of the error metric.

Consequently, a metric that is simple to calculate and is indicative of whether the sampling phase is advanced or retarded relative to an optimal sampling phase in provided. Since the metric is calculated based on signals typically available in a demodulator the invention is implemented in a very cost-efficient way. Additionally, since the metric needs only be calculated at symbol rate the computational effort involved is very limited.

Since the error metric is a function of the error value and the symbol values, the latter corresponding to the data the symbols represent, the error metric can be configured to take into account an expected effect of Inter Symbol Interference. Hence, the error metric can be updated according to the magnitude of the expected Inter Symbol Interference.

Moreover, the invention relates to a mobile telephone comprising a signal processing apparatus as set forth above; and a method of processing a signal.

The present invention will be described in more detail in the following detailed description of the invention and with reference to the drawings, in which.

As an introduction to the detailed description, a communications link, a receiver, and some demodulation aspects are explained.

Figure 1:
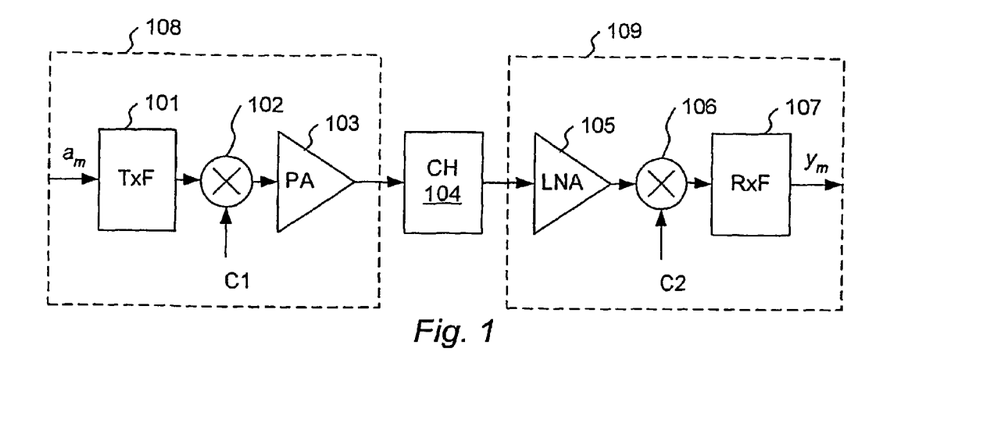
FIG. 1 shows a block diagram model of a communications link.

FIG. 1 shows a block diagram model of a communications link. The block diagram model illustrates a communications link in a simple way. The communications link comprises an ideal transmitter 108 capable of modulating a carrier signal with a sequence of symbols $a_m$ to provide a communications signal that can be transmitted over a communications channel CH 104. A base band circuitry (not shown) provides the sequence of symbols $a_m$ to a transmitter filter TxF 101, which provides a filtered sequence of symbols to a mixer 102. By means of the mixer 102, a carrier signal C1 is modulated with the filtered sequence to provide the communications signal. The communications signal is amplified by means of a power amplifier PA 103 prior to being transmitted via the communications channel 104.

At the receiver side of the communications channel 104 the communication link comprises an ideal receiver 109 which is capable of demodulating the communications signal to provide a base band signal Yk to a base band circuitry (not shown). The communications signal is received and amplified in a low noise amplifier 105 wherefrom it is input to a mixer 106. By means of the mixer 106 the communications signal is mixed with a signal C2 to thereby provide a down-converted input signal to a receiver filter RxF 107, which in turn provides the base band signal $y_k$.

Typically, the bandwidth of the communication channel sets the upper limit for the rate at which symbols can be transmitted. Since, the information to be transmitted is in digital form, a digital signal with square wave pulses can be used to modulate the carrier signal. Conceptually, supplying a carrier signal and the digital signal to a mixer, which thereby provides a modulated signal, carries this out. However, the modulated signal will occupy a relatively large bandwidth as a result of the carrier being mixed with a square wave signal. Therefore, the digital square pulses in the digital signal are shaped before they are mixed with the carrier signal. The square wave pulses are shaped with the transmitter filter TxF 101 that, on the one hand and as desired, limits the bandwidth and consequently, on the other hand, extends the length of the pulse in the time domain. By this technique, also denoted 'pulse shaping' or 'softening', the transmitted bandwidth is reduced because it produces greatly diminished side-components farther away from the carrier. In order to optimise the achievable symbol rate on the channel, the receiver filter RxF 107 is matched with the transmitter filter TxF 101 to have, in combination, an impulse response that allows for transmitting symbol pulses with a repetition period that is smaller than the length of the impulse response without destroying the information that a symbol pulse carries.

To characterize the impulse response of the receiver filter RxF and the transmitter filter TxF in combination (that is, the convolution of the impulse responses of the receiver filter and the transmitter filter) relative to the symbol repetition period; the impulse response must have side-lobes in the time-domain and the impulse response must have a sufficiently long time duration relative to the repetition period as to allow for a temporal overlap between a pulse and side-lobes of another pulse.

Commonly, the rate and the phase of the symbol pulses are configured such that succeeding and preceding symbol pulses occur incidentally with zero-crossings of a present symbol pulse. Preferably, a filter with a pulse response corresponding to a so-called raised cosine pulse is used for shaping the digital signal.

In the time-domain the raised cosine pulse is defined by the following:

$$r(t) = \operatorname{sinc}\left(\frac{t}{T}\right) \cdot \left[\frac{\cos\left(\frac{\alpha \cdot \pi \cdot t}{T}\right)}{1 - \left(\frac{2 \cdot \pi \cdot t}{T}\right)^2}\right]$$

wherein r is a function of time t, T is a time period, and α is a so-called roll-off parameter. Applying the principle of configuring the rate and the phase of the symbol pulses such that succeeding and preceding symbol pulses occur incidentally with zero-crossings of a present symbol pulse implies that the repetition rate for symbols must be integer multiples of T.

In case the applied modulation/demodulation scheme is Phase Shift Keying (PSK), a phase rotation can be applied from one symbol to a next symbol. Thereby, 180 degrees phase shifts between two consecutive symbols are avoided. This, in turn, eliminates signal transitions, between two consecutive symbols, through the origin when the signal is depicted in an IQ-plane. It should be noted that such transitions through the origin are undesired since they reflect that the signal has zero amplitude and consequently involves that the receiver and the transmitter must be able to operate at a larger dynamic range, which is undesirable. Avoiding these transitions through the origin reduces variations of the envelope of the signal and thereby provides a steadier signal.

Figure 2:
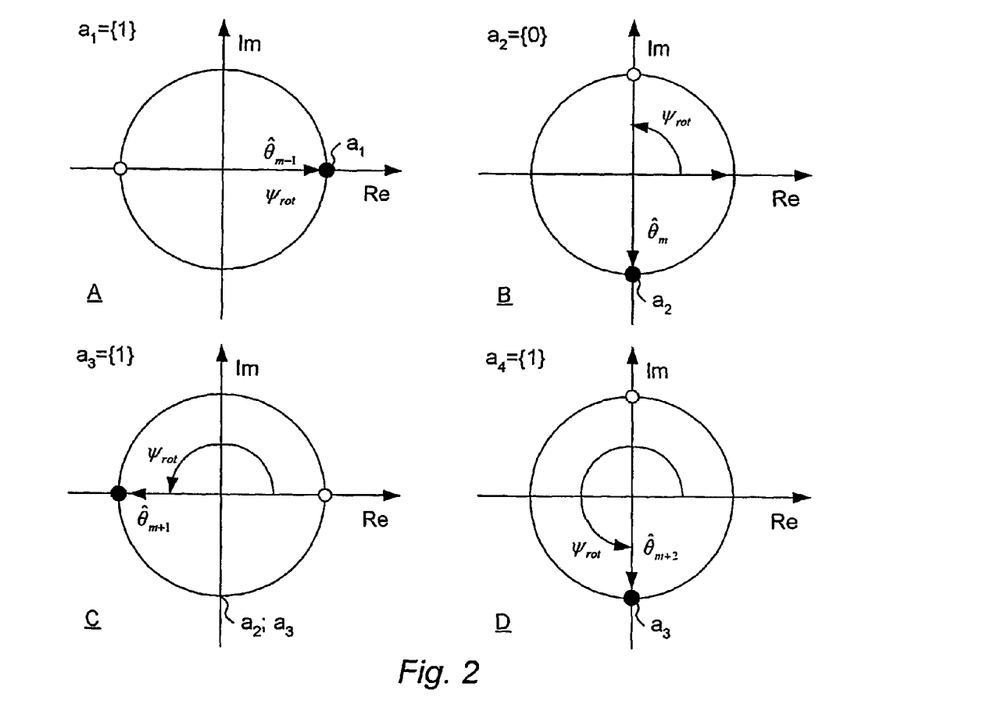
FIG. 2 shows four symbols of a π/2-rotated BPSK signal mapped into a respective IQ-plane.

FIG. 2 shows four symbols of a π/2-rotated BPSK signal mapped into a respective IQ-plane. The four symbols $a_1$, $a_2$, $a_3$, and $a_4$ are mapped into the IQ-planes A, B, C, and D, respectively. Generally, the binary value "0" is mapped into a signal component value of +1, whereas the binary value "1" is mapped into a signal component value of −1. Please note that generally subscript numbers or letters, typically m, are used as a time-index to designate a symbol or sample value in a sequence of values.

For the first symbol $a_1$, it is assumed that the applied rotation $\psi_{rot}=0$. The symbol has a binary value of 1 so consequently the symbol will located at the coordinate (1,0).

The next symbol $a_2$ is exposed to a rotation of π/2, hence the binary value of $a_2$ will be located at (0,1) for a binary value of 1 or at (0, −1) for a binary 0. The binary value of $a_2$ is 0, so $a_2$ will be located at (0, −1).

In line with this, the applied rotation of $a_3$ is 2π/2=π. Therefore the binary value of $a_3$=1 will be located at (−1,0).

Similarly, the applied rotation of $a_4$ is 37π/2=−π/2. Therefore the binary value of $a_4$=1 will be located at (0,−1).

Having explained the rotation in the IQ-plane, the I- and Q-components are illustrated in the time-domain.

Figure 3:
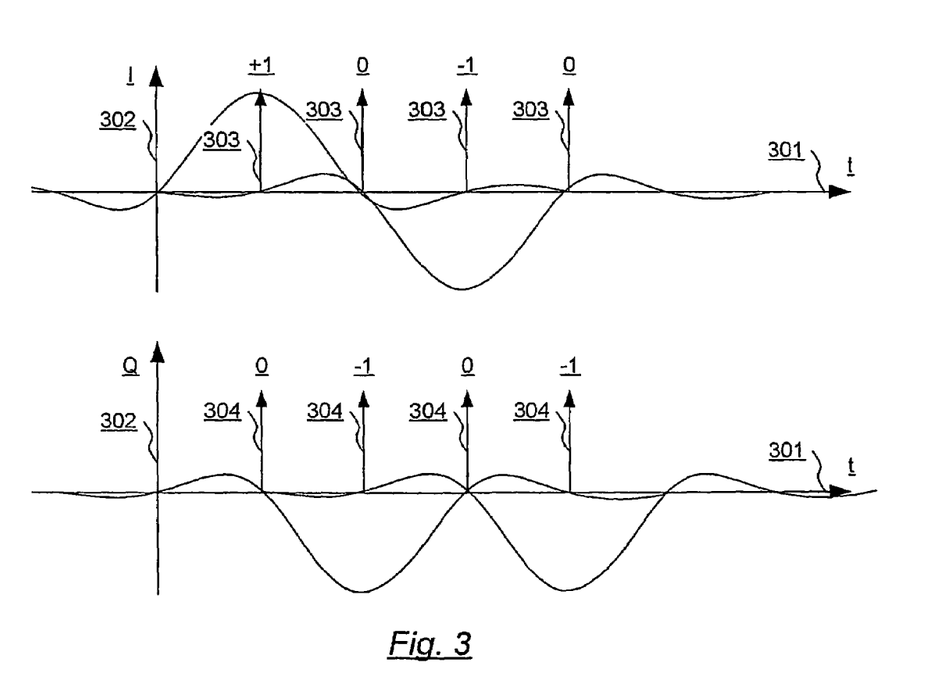
FIG. 3 shows I- and Q components of a π/2-rotated BPSK signal in the time-domain.

FIG. 3 shows I- and Q components of π/2-rotated BPSK signal in the time-domain. The I- and Q components are shown as decomposed by an impulse response corresponding to a raised cosine function. The impulse response corresponds to a raised cosine pulse with roll-off α=0,4. The components are shown for the above four symbols $a_1$, $a_2$, $a_3$, and $a_4$ with symbol values 1; 0; 1; and 1.

The components are shown in the time-domain as a function of time t, wherein time axes 301 are divided into units of the symbol repetition period, and wherein the I- and Q-axes 302 represent amplitude.

By means of arrows 303, sample values of the I-component in the received signal are represented. Similarly, by means of arrows 304, sample values of the Q-component in the received signal are represented. The sample values occur at symbol rate. Examination of the decomposition of the I- and Q components indicates that sampling the I-component pulse of symbol $a_2$=0 either too early or too late in time will result in constructive inter symbol interference from the preceding and succeeding symbol. However, sampling the Q-component pulse of symbol $a_3$=0 either too early or too late in time will result in less inter symbol interference from the preceding and succeeding symbol since the effect of the pulses will almost cancel out relatively close (i.e. within 1-3/16 of a symbol period) to an optimal sampling time of $a_3$.

Figure 4:
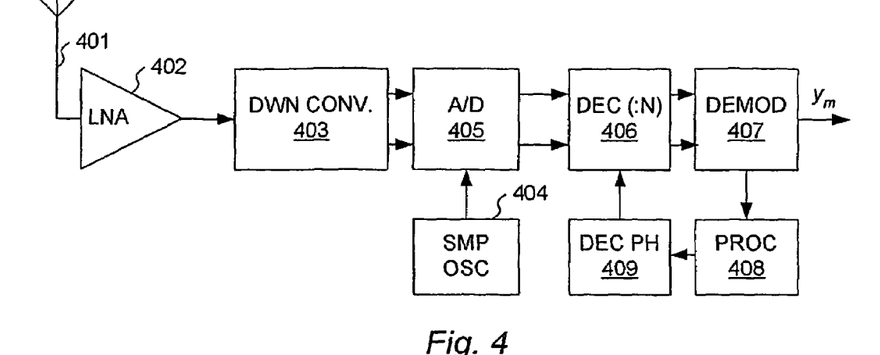
FIG. 4 shows a block diagram for a digital receiver.

FIG. 4 shows a block diagram for a digital receiver. The digital receiver comprises an antenna 401 for receiving a wireless communications signal and converting the wireless signal to an electrical signal. Typically, the electrical signal is a high frequency signal with a signal strength that is weak; hence the electrical signal from the antenna 401 is input to a low noise amplifier LNA 402 wherein it is amplified to provide an amplified signal. The amplified signal is supplied to a down-converter circuit Dwn. Conv. 403 wherein the communications signal located at a carrier frequency is converted to base band signal components. In the present embodiment the base band components consist of an in-phase component 1, and a quadrature phase component Q. Up to this stage of signal processing the signals are analogue signals, however by means of an analogue-to-digital converter 405, the base band components are sampled and converted to a sequence of digital sample values. The points in time at which the signal components are sampled are controlled by a periodic sampling signal provided by an oscillator, SMP OSC 404. Typically, the signal components are over sampled N times (e.g. N=16 times).

In order to reduce the processing effort needed for subsequent processing of the base band components, the sequence of digital sample values is decimated (typically N times) by means of decimator DEC 406. Hence, the rate of sample values per signal component is reduced to the rate of symbols per signal component. The decimator 406 is controlled by a unit DEC PH 409 for selecting a decimation phase by selecting which of N samples is to be provided as an output from the decimator. Thereby, the phase can be adjusted in 1/N-sized steps.

In order to provide a precise adjustment of the sampling phase it is desired to make the adjustment in fine steps, however, when the over sampling ratio (N) is relatively low (e.g. N=1,2,4, or 8), it may lead to an insufficiently small step size to simply select one out of N samples. In order to solve this problem, an interpolator may be applied to provide an interpolated value or multiple interpolated values intermediate to the sampled values. The interpolated value or values allows for adjustment in smaller steps than the 1/N-sized steps that are available without interpolation. It is well-known to a person skilled in the art to apply such an interpolator.

Following the decimation, digital sample values are provided to a demodulator DEMOD 407. The demodulator contains circuitry for converting the sequence of sample values to information bits $y_m$. Processor PROC 108 implements an algorithm, according to the invention, for adjusting the phase of samples provided to the demodulator. In a preferred embodiment, the demodulator, wherein data for the algorithm are typically available, provides input to the algorithm. The phase of the samples is adjusted by controlling the phase of the decimator and/or the phase and/or frequency of sampling oscillator 204.

For the purpose of demonstrating the present invention in the light of a simple linear model, it is assumed that a linear receiver is employed and that the modulation of a received signal is binary pulse-amplitude modulation, PAM. Additionally, let h(t) denote the overall impulse response as a function of time t for a linear transmission link from an ideal transmitter via a transmitter filter, a transmission channel filter, and a receiver filter. Here, the term filter is used to designate a linear model. Then, the output r(t) of the receiver filter can be expressed as:

$$r(t) = \sum_m a_k h(t - mT) + n(t)$$

where $\alpha_m \in \{-1,1\}$ is the information to be transmitted from the ideal transmitter and n(t) is additive noise. It then follows that if the received signal is sampled at instants τ=τ+mT, where τ is the error in sampling time, the samples in the received sequence can be expressed as:

$$r(\tau + mT) = h(\tau)\left[a_m + \frac{1}{h(\tau)}\sum_{k \neq 0} a_{m-k} h(\tau + kT) + \frac{n(\tau + kT)}{h(\tau)}\right]$$

For simplicity and with arguments, which will be captured later, the noise term is removed. Additionally, since the present invention is concerned with time-tracking as opposed to timing recovery, it can be assumed that τ<<1, so that h(τ)≅h(0) for common pulse shapes of h(t). Consequently, assuming h(0) ≈1, the received signal can be expressed as:

$$r(\tau + mT) = a_m + \sum_{k \neq 0} a_{m-k} h(\tau + kT)$$

It is obvious that the first term is the desired one in that it is the true information, whereas the terms in the sum over k, for k≠0 might cause Inter Symbol Interference, ISI.

In interpreting the above simplified expression it is noteworthy to point out that:
1. For many reasonably choices of h(t), h(kT)≅0 for k≠0. Hence, for small values of τ the Inter Symbol Interference will be very small. In case h(t) is a raised cosine pulse it will be identical to zero.
2. The ISI will depend on the actual data. If the data are known, the ISI can be counteracted; this is the principle of a decision directed equalizer,
3. τ can be determined if knowledge of r(τ+mT), h(t), and all $a_m$ is available.

Hence, since h(t) basically is a design parameter, and since r(τ+mT) is what is observed as the received signal, these are both known. Actually, this is not completely true since h(t) is assumed to also include the channel, but assuming the delay-spread of the channel is negligible it is true.

Prima facia, the received data $a_m$ is not known. However, by means of for instance a decision-directed demodulator it is possible to estimate the received data— and often this can be carried out under a high probability of making a correct decision.

Figure 5A:
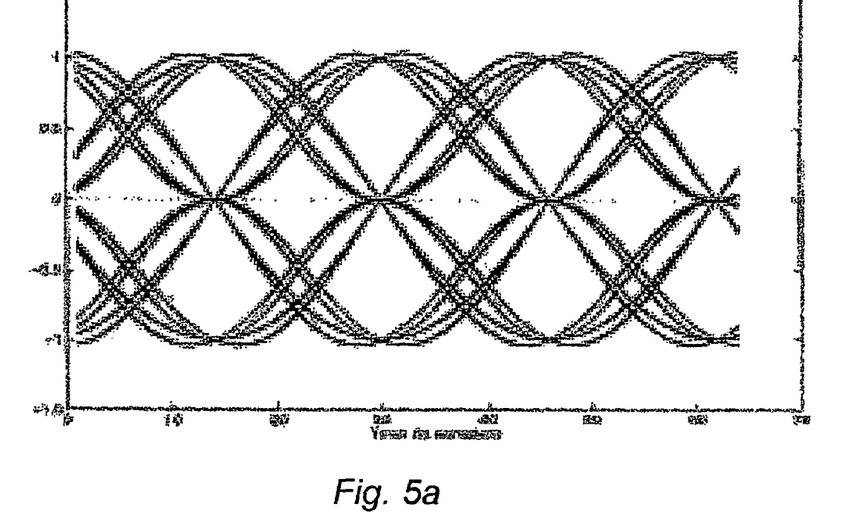
FIG. 5a shows an eye-pattern for a π/2-rotated Binary Phase Shift Keying (BPSK) modulated signal.

FIG. 5a shows an eye-pattern for a π/2-rotated Binary Phase Shift Keying (BPSK) modulated signal. The figure shows multiple signal traces of the I- and Q-component of a π/2-rotated BPSK modulated signal recorded for multiple different received data sequences $a_m$. The eye-pattern is based on a signal composed of an impulse response h(t) corresponding to a raised cosine pulse with roll-off α=0,4. The signal components are over sampled OSR=16 times and the ideal sampling moments are at sampling instants 14, 30, 46 and 62. Considering the I-component, a symbol value of zero is transmitted at sampling instant 30, whereas a symbol value of plus or minus one is transmitted at sampling instants 14 and 46.

For a given signal trace at one of the sampling instants 14, 30, 46, and 62 the impact of ISI can be evaluated. Considering for instance the sampling interval located around sampling instant 30 and assume this is sample m, four major traces can be seen (actually, each major trace is made up of two minor traces). If sample m−1, sampled at sampling instant 14, takes the value minus one and if sample m+1, sampled at sampling instant 46, takes the same value, then the gradient of the traces around sampling instant will be relatively small. This also applies if the value of sample m−1 and sample m+1 is plus one. On the contrary, if sample m+1, sampled at sampling instant 46, takes a different value (than m−1), then the gradient of the traces around the sampling instant will be relatively large. When the gradient is relatively large the impact of ISI is also relatively large, and vice versa. Similar deductions are made with reference to FIG. 3.

Since h(τ+kT)≈0; k being an integer number different from k=−1 and k=1, this means that two symbols only; the preceding one and the succeeding one essentially causes the ISI. This simply implies that there are only two non-zero terms in the sum in the simplified expression above. It can also be seen that in case the sampling error is small, say ¹⁄₁₆ of a symbol (corresponding to one sample when OSR=16) three distinct trajectories are found. In this case the ISI will be close to zero based on the condition that the previous and the succeeding signals are the same, due to the fact that ISI introduced by these two symbols then will cancel out. Therefore, the experienced ISI will only become a problem when the previous and successive signals differ.

In case the timing error is larger, say ²⁄₁₆ of a symbol, then four distinct ISI trajectories are found due to the ISI, caused by the previous and successive signal, no longer being able to cancel. However, the resulting ISI is still significantly smaller than when the previous and successive symbols were different. Thus, it is verified that ISI is related to sampling error.

Due to an introduced π/2-rotation, symbol decisions are alternately made on the real part and the imaginary part of the signal. Hence, the decision on the symbol value is based on the Q-component around sampling instant 30, whereas it is based on the I-component around sampling instant 14 and 46.

In case phase modulation is employed, the phase rather than the real and imaginary parts of the signal could have been considered.

Alternatively, the above deductions could have been carried out by directly considering the shape of the impulse response h(t).

Figure 5B:
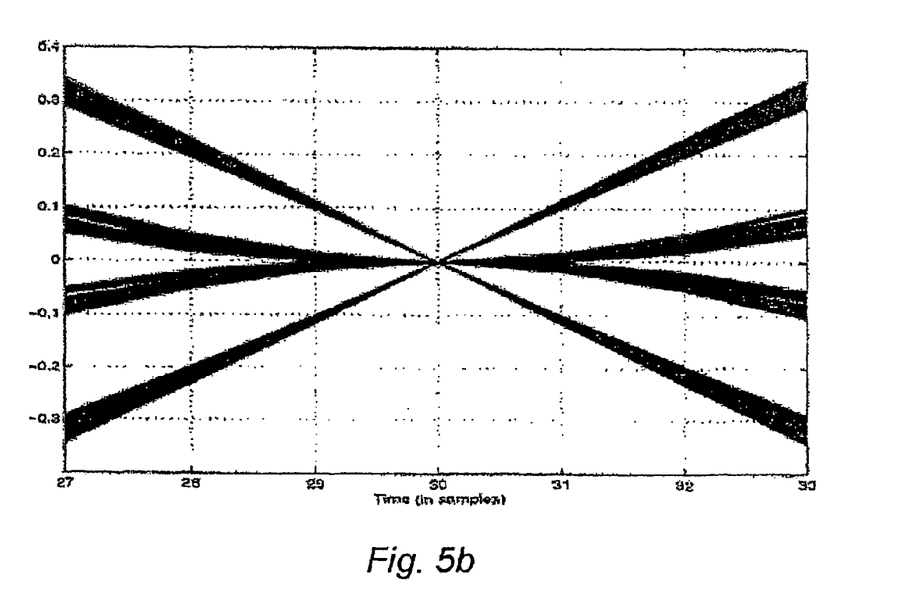
FIG. 5b shows a zoom-in of an eye-pattern for a π/2-rotated BPSK modulated signal.

FIG. 5b shows a zoom-in of an eye-pattern for a π/2-rotated BPSK modulated signal. Based on this eye-pattern, the below table 1 can be filled-in.

TABLE 1 shows the relation between received symbols (θ) and the resulting ISI (φ) when the sampling is one and two samples (smp.) too late.

| $\theta_{m-1}$ | $\theta_m$ | $\theta_{m+1}$ | $\phi_m$ (+1 smp.) | $\phi_m$ (+2 smp.) |
|---|---|---|---|---|
| −π/2 | 0 | −π/2 | 0 | −0.04 |
| −π/2 | 0 | π/2 | 0.11 | 0.21 |
| π/2 | 0 | −π/2 | −0.11 | −0.21 |
| π/2 | 0 | π/2 | 0 | 0.04 |

Note that due to the π/2-rotation, the phase shift between two consecutive symbols will have to be ±π/2. Also, note that it is only the phase shift between the consecutive symbols that are of interest.

$\phi_m$ is the phase error between the phase value of the mth symbol and the estimated phase value of the mth symbol. The phase value of the mth symbol is obtained by demodulation and the estimated phase value is obtained in a decision directed way. Hence, $\phi_m$ can be determined as the difference $\phi_m = \theta_m - \hat{\theta}_m \cdot \phi_m$ can be used as a simple measure for updating the sampling time.

However study of table 1 reveals that a simple measure based on $\phi_m$ only will not contain information whether the sampling time is too early or too late. This may result in poor performance of the time tracking.

Hence, a more detailed metric is used:

$$\phi_m(\theta_{m+1}-\theta_{m-1})$$

This metric uses the information in $\hat{\theta}$ to establish information whether sampling is too early or too late. Thereby, time tracking can be taken in the correct direction towards reducing φ and consequently the ISI. An algorithm for updating the sampling time or sampling instant according to the above will be described in the following.

Figure 6A:
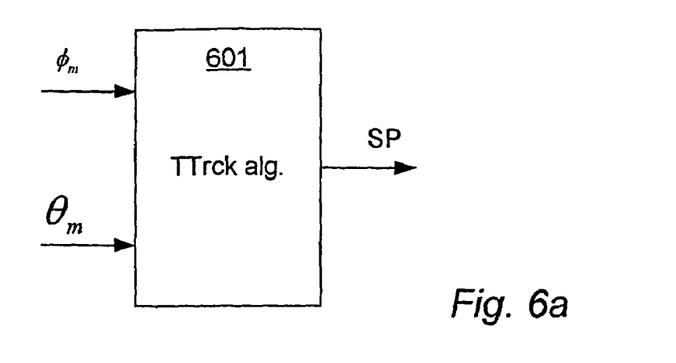
FIG. 6a shows processor according to the invention.

FIG. 6a shows a processor according to the invention. The processor receives input from e.g. a demodulator. The input is $\phi_m$ and $\theta_m$. The output from the processor is SP, which is a control signal for adjusting the sampling phase. Preferably, the signal is a signal that indicates whether the sampling phase is to be advanced or retarded or remain unchanged corresponding to SP signal values {+1; −1; 0}, respectively. Alternatively, the signal indicates which of a number of samples is to be selected from e.g. a decimator. With an over-sampling ratio OSR of OSR=16, the signal can indicate that sample no. 8 is to be selected. If the phase is to be advanced, the signal can indicate that sample no. 9 is to be selected instead.

Figure 6B:
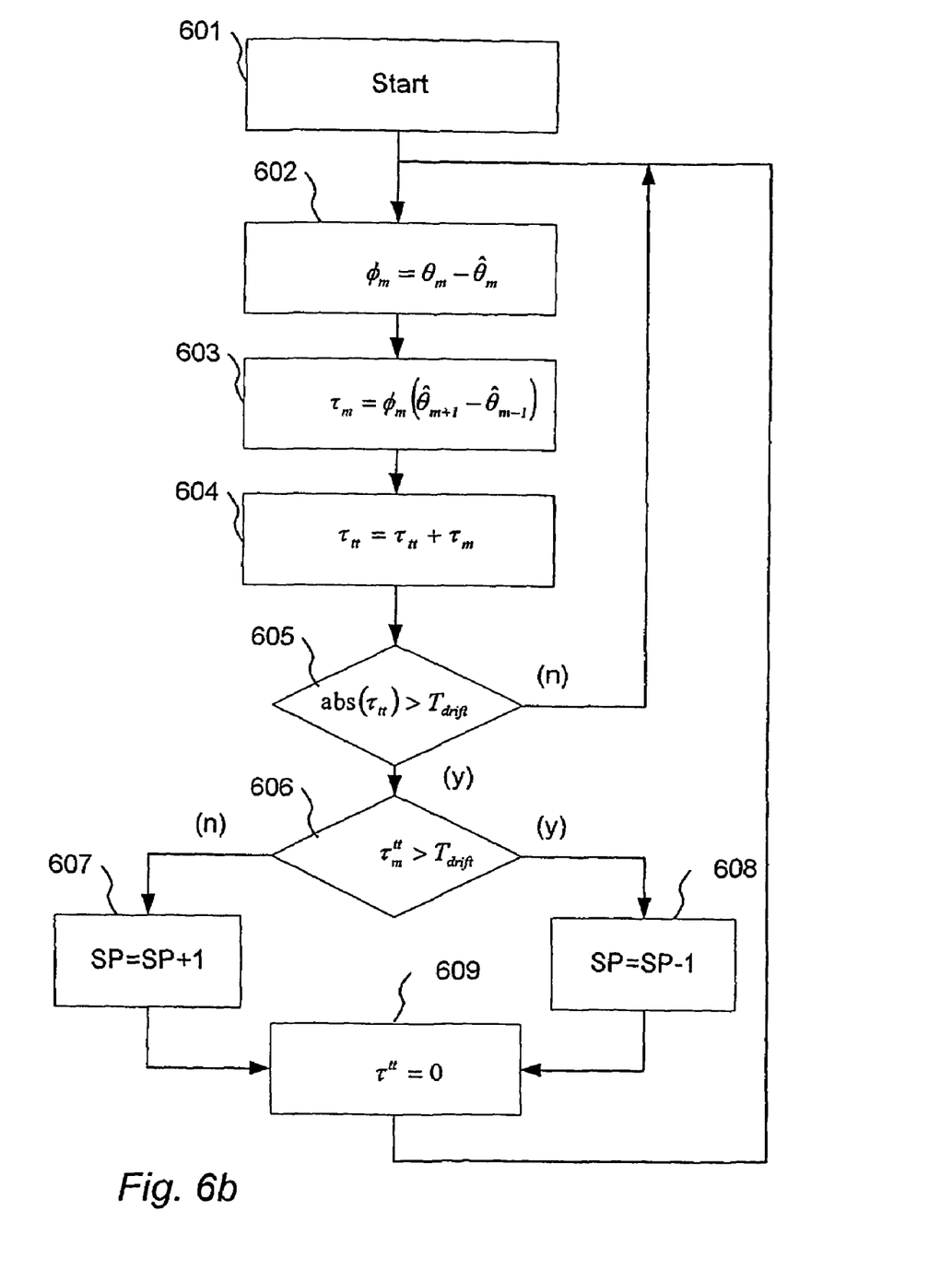
FIG. 6b shows a flowchart for an algorithm according to the invention.

FIG. 6b shows a flowchart for a method of updating the sampling time or sampling instant. The method is started in step 601, wherefrom the method enters step 602.

In step 602 the phase error $\phi_m$ is calculated as the received phase $\theta_m$ minus the ideally received phase $\hat{\theta}_m$ obtained in a decision directed fashion. Hence, in step 602 the following expression is evaluated: $\phi_m = \theta_m - \hat{\theta}_m$.

When the phase error is calculated, it is possible to calculate the error metric (τ) in step 603: $\tau_m = \phi_m(\hat{\theta}_{m+1}+\hat{\theta}_{m-1})$ In a succeeding step 604, a variable $\tau^{tt}$ for time tracking is updated, according to $\tau^{tt} = \tau^{tt} + \tau_m$. Please note that superscript 'tt' is used for designating the variable for time tracking. In case the sampling is performed too late, then $\tau^{tt}$ will on average increase, whereas in case the sampling is done too early, then $\tau^{tt}$ will on average decrease.

In step 605 the absolute value abs($\tau^{tt}$) of $\tau^{tt}$ is compared with a threshold value, $T_{drift}$. In case abs($\tau^{tt}$)>$T_{drift}$, then the used sampling instant is updated according to the sign of $\tau^{tt}$ and $\tau^{tt}$ is reset i.e. $\tau^{tt}=0$.

The update of the sampling phase is carried out in either step 608 or step 607 wherein the phase is decreased or increased, respectively. This is expressed by the following pseudo code:

---
if $\tau^{tt}$ > $T_{drift}$, then
   SP = SP − 1
   $\tau^{tt}$ = 0
else, if $\tau^{tt}$ < −$T_{drift}$, then
   SP = SP + 1
   $\tau^{tt}$ = 0
end

---

Above, the latter two of the three first steps are used to calculate a metric for the m'th symbol. The fourth step is used to sum the metrics for all the symbols in order to average out fluctuations due to noise. In case the sampling is done too late, $\tau^{tt}$ will on average increase, whereas in case the sampling is done too early, then $\tau^{tt}$ will on average decrease. Thus, it is reasonable to discard the noise term mentioned in the introductory portion of the detailed description with regard to the linear model since this noise term is averaged out.

Finally, in the fifth step, this accumulated metric is compared with thresholds to determine if an update of the sampling phase should be executed. In case an update is executed, the variable for the accumulated metric is reset to zero.

Thus, there are essentially two steps needed to come up with the principal behaviour of the algorithm. First, determine the effect a sampling time error has on the phase error for different consecutive symbols, for instance by generating tables like table 1 above. Second, define an algorithm as the one defined in the five points above which reflects the content in the abovementioned table.

So far, the invention has been explained with reference to the BPSK modulation, which requires coherent demodulation. In the following, the invention is to be explained with reference to DPSK modulation, which allows for using non-coherent, fully coherent or semi-coherent demodulation. However, it is noted that especially when semi-coherent demodulation is applied the invention can be embodied with very little added complexity since the invention can make use of signals available in a semi-coherent demodulator.

Before explaining how to implement this sampling time tracking algorithm in connection with a (semi-coherent) demodulator, the working principle of a known semi-coherent demodulator will be explained.

Figure 7:
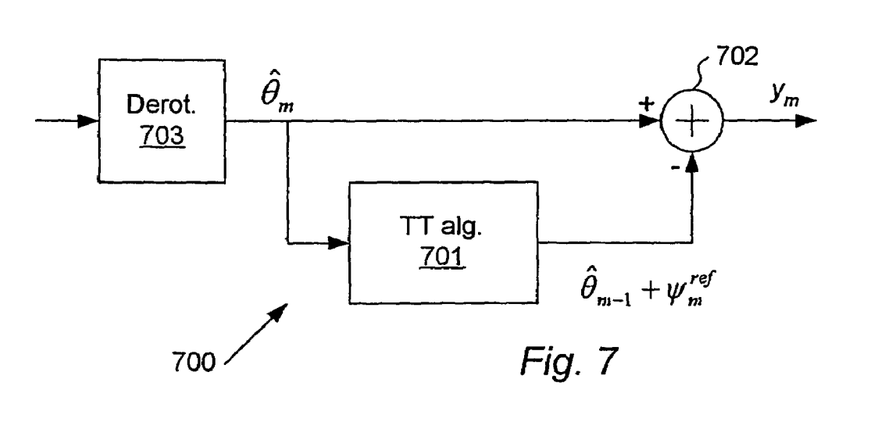
FIG. 7 shows a block diagram model of a semi-coherent demodulator.

FIG. 7 shows a block diagram model of a semi-coherent demodulator.

The demodulator 700 constitutes a part of the receiver and it may receive its input in digital form, from the receiver filter. In case the receiver provides signal components (e.g. I and Q components) representing a signal in the Cartesian or Euclidian system of coordinates, the signal is converted to a phase representation. Hence input to the demodulator is in the form of phase values. Magnitude information may be provided as a result of the conversion, but this information is typically discarded as regards the demodulator.

In case the demodulator operates in a steady state and no update of the phase is needed, the expected reference phase $\psi^{ref}$ for a symbol $\theta_m$ is the phase of the previous symbol $\theta_{m-1}$. The phase of the previous symbol is actually not known, but making a tentative decision based on the realised phase of symbol $\theta_{m-1}$ provides an estimate $\hat{\theta}_{m-1}$. This tentative decision to provide the estimate is carried out in the unit 601. The estimate is feed forward to an adder 702, wherein the estimate is subtracted from the realised phase to thereby provide a demodulated signal $y_m$. This signal can be decoded by e.g. a look-up table according to the applied modulation/demodulation scheme to retrieve the transmitted information.

In case the demodulator operates in a steady state, but wherein an update of the reference phase $\psi^{ref}$ is needed, the expected phase for the symbol $\theta_m$ is the phase of the previous symbol $\theta_{m-1}$ compensated for an update of the phase. Typically, the update is estimated to be the difference between the decision-directed estimate of the phase and the realised phase of symbol $\theta_m$.

As the name suggests, this demodulator is neither fully non-coherent nor fully coherent. The amount of coherence is determined by a coherence parameter α. The basic idea with a semi-coherent demodulator is to build up a phase reference in a decision directed fashion. In a fully non-coherent case, this phase reference would in fact be the phase of the previously received symbol, thus being as noisy as the phase of the received signal itself. In case of a fully coherent demodulator, the phase reference would be noiseless. By creating a phase reference by using several symbols, this reference becomes less noisy. Actually, the idea behind the semi-coherent demodulator is to create a phase reference that is less noisy than the signal itself, but still does not require perfect knowledge of the phase, which would be the case if coherent reception was used.

The semi-coherent demodulator is configured to cooperate with simple means (e.g. a so-called slicer) for making a tentative decision on which one out of specified signal points a received signal point tend to be.

If, for instance, DQPSK modulation is used, the specified signal points is expected to be 0; π/2; π; and 3π/2, so when making a tentative decision, boundaries for making a decision are located at π/4; 3 π/4; 5π/4; and 7π/4. Since DQPSK involves differential modulation, a phase rotation of the entire signal constellation will cancel out once the difference between two symbols is taken. However, if the signal is rotated by the channel e.g. π/4, then it is not possible to make a reliable tentative decision—a received signal point may in this case be located at the decision boundary. The phase reference, designated by symbol $\psi^{ref}$ is an estimate of this rotation. In order to cooperate with a simple slicer, this rotation is removed before the tentative decision is taken by the slicer.

In case a frequency offset is present, a (true) phase rotation is inherently present. The phase reference $\psi^{ref}$ shall vary in the same way as this true rotation in order to be able to remove this true rotation. If the frequency offset is positive, the phase reference $\psi^{ref}$ will increase accordingly. The update of $\psi^{ref}$ is typically carried out by some type of low-pass filtering, which can be implemented by a simple IIR filter (or alternatively a FIR filter). An example of the update is based on the following:

$$\psi_m^{ref} = \alpha \cdot \psi_{m-1}^{ref} + (1-\alpha)(\psi_m^{ref} - \phi_m)$$

Wherein $0 < \alpha < 1$. If $\alpha \approx 1$ the reference is heavily filtered, whereas if $\alpha = 0$ no filtering at all takes place.

The above expression can also be rewritten:

$$\psi_{mm}^{ref} = \psi_{m-1}^{ref} + (1-\alpha)(\psi_m^{ref} - \hat{\theta}_m - \psi_{m-1}^{ref})$$

$$\psi_m^{ref} = \psi_{m-1}^{ref} + (1-\alpha)(\phi_m)$$

where $\phi_k$ is the phase error obtained from $\theta_m$ after the reference phase $\psi_m^{ref}$ has been removed.

In a fully non-coherent demodulator the feed-forward loop would consist of a simple delay element only, so that the reference for $\theta_m$ would be $\theta_{m-1}$. Here, the reference consists of two terms, corresponding to a decision made for the previous symbol, $\theta_{m-1}$ and a phase reference $\psi_{mm}^{ref}$.

Having discussed the coherence principle of the demodulator, the decoding principle of a (semi-coherent) π/2-rotated DPBSK demodulator can be expressed by the below seven (1-7) steps:

| Step | Expression: |
|---|---|
| 1. | $\psi_m^{rot} = (\psi_{m-1}^{rot} + \pi/2) \bmod 2\pi$ |
| 2. | $\theta_m^{derot} = \theta_m - \psi_m^{rot} - \psi_{m-1}^{ref}$ |
| 3. | $\hat{\theta}_m^{derot} = \begin{cases} 0: & |\theta_m^{derot}| < \pi/2 \\ \pi: & \text{otherwise} \end{cases}$ |
| 4. | $\hat{\theta}_m = \hat{\theta}_m^{derot} + \psi_m^{rot}$ |
| 5. | $\phi_m = \theta_m - (\hat{\theta}_m + \psi_{m-1}^{ref})$ (i.e. a phase error for present symbol) |
| 6. | $\psi_m^{ref} = \psi_{m-1}^{ref} + (1-\alpha)\phi_m$ (i.e. a phase reference) |
| 7. | $y_m = \theta_m - \hat{\theta}_{m-1} - \psi_m^{ref} - \pi/2$ |

Step 1 above reflects that the received signal is a π/2-rotated BPSK signal, wherein a succeeding symbol is rotated π/2 relative to a preceding symbol. The absolute phase rotation applied for symbol m is equal to the absolute phase rotation of the previous symbol $\theta_{m-1}$ plus the relative, applied rotation between two consecutive symbols.

Step 2 reflects that the phase of a symbol $\theta_m$ is rotated back (i.e. de-rotated) to an original phase (i.e. before rotation) and that the reference phase is subtracted, which is required for subsequent step 3.

Step 3 expresses the tentative decision made on the received de-rotated phase of the mth symbol. The result of this tentative decision is an estimated phase of the mth received symbol. The phase is asserted to have the value 0 or π, since the modulation in this case is binary.

Step 4 represents an estimate of the phase of the received symbol m, i.e. the estimate of the de-rotated phase plus the applied, relative rotation of π/2.

Step 5 represents a calculation of the phase error for the received symbol $\theta_m$. In case of perfect coherent reception, $\psi^{ref}$ would be zero so that step 5 would be reduced to $\phi_m = \theta_m - \hat{\theta}_m$.

Step 6 reflects an update of the accumulated phase error with a weighting factor $(1-\alpha)$ of the phase error for the received symbol $\theta_m$.

Step 7 shows that the output of the demodulator is generated from the difference between the phase of the received symbol m and the preceding symbol $\theta_{m-}$. The result is compensated from the applied rotation (π/2) between two consecutive symbols and the phase reference $\psi^{ref}$.

Finally, values of $y_m$ can be converted to the binary values one or zero by a binary quantifier e.g. by a so-called slicer.

Having explained the working principle of a semi-coherent demodulator, implementation of the sampling time tracking algorithm in connection with a (semi-coherent) demodulator will be described.

Figure 8:
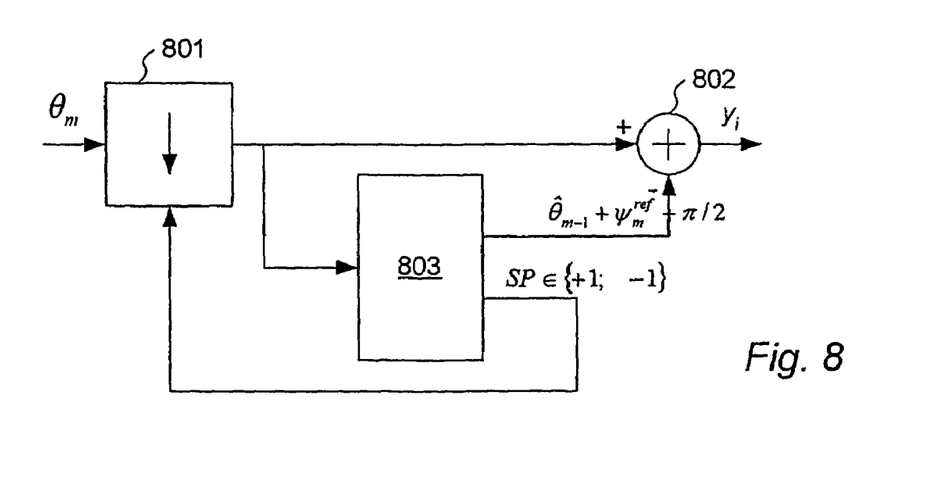
FIG. 8 shows a semi-coherent demodulator according to the invention for adjusting the sampling phase according to the invention.

FIG. 8 shows a semi-coherent demodulator according to the invention for adjusting the sampling phase according to the invention. The demodulator is arranged to adjust the sampling phase by controlling decimator 801 to output a selected one out of N samples. In case the demodulator operates in the phase domain, input to the demodulator is in the form of samples representing phases of symbols. An output signal $y_m$ is generated in accordance with the above-described principle for a semi-coherent demodulator implemented by unit 803 in combination with adder 802. Note that the de-rotation is implemented by the unit 803 as opposed to being implemented in a separate unit.

Having explained the semi-coherent demodulator according to the invention the working principle for the time-tracking algorithm will be explained in more detail below.

| Step | Expression |
|---|---|
| 8. | $\tau_{m-1}^e = \begin{cases} -\phi_{m-1}: & \hat{\theta}_{m-2} - \hat{\theta}_{m-1} = -\pi/2 \\ \phi_{m-1}: & \hat{\theta}_{m-2} - \hat{\theta}_{m-1} = \pi/2 \end{cases}$ |
| 9. | $\tau_{m-1}^l = \begin{cases} \phi_{m-1}: & \hat{\theta}_m - \hat{\theta}_{m-1} = \pi/2 \\ -\phi_{m-1}: & \hat{\theta}_m - \hat{\theta}_{m-1} = \pi/2 \end{cases}$ |
| 10. | $\tau'' = \tau'' > \tau_{m-1}^l - \tau_{m-1}^e$ |

-continued

| Step | Expression |
|------|-----------|
| 11. | if $\tau'' > T_{drift}$, then<br>    SP = SP − 1<br>    $\tau'' = 0$<br>else, if $\tau'' < -T_{drift}$, then<br>    SP = SP + 1<br>    $\tau'' = 0$<br>end |

In step 8 an error metric representing an advanced sampling phase is calculated. This metric is configured such that the difference between sample values of two consecutive symbols that precedes a given symbol determines the value of the metric by determining the sign of the preceding phase error.

Similarly, in step 9 an error metric representing a retarded sampling phase is calculated. This metric is configured such that the difference between sample values of given symbol and a preceding symbol determines the value of the metric by determining the sign of the preceding phase error.

Step 10 represents an iterative update of a total error metric being composed of the error metric representing a retarded sampling phase and the error metric representing an advanced sampling phase.

In step 11 a variable, SP, for updating the sampling phase is updated. SP is provided to a decimator for shifting the sampling phase.

Figure 9:
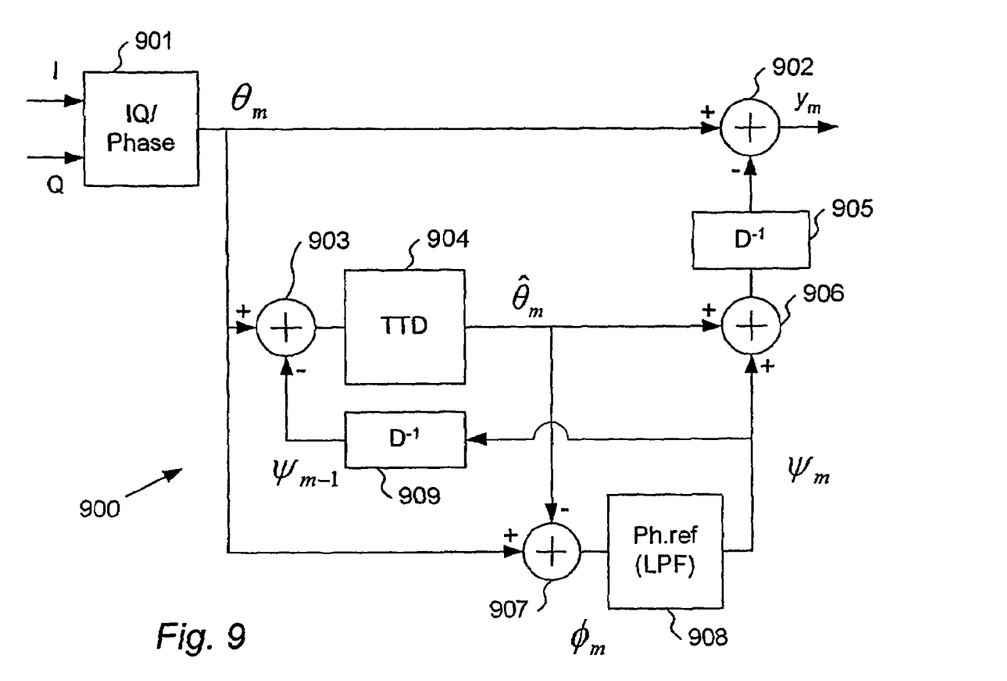
FIG. 9 shows a more detailed block diagram of a semi-coherent demodulator.

FIG. 9 shows a detailed block diagram of a semi-coherent demodulator. A phase value $\theta_m$ of a received symbol m is provided by a converter 901 that converts an I- and Q-sample value of a symbol to a phase value, which is the phase between the I- and Q-component of the symbol. The phase value $\theta_m$ is input, via an adder 903, to a decision unit 904, wherein a decision-directed determination is made to provide an estimated phase value $\hat{\theta}_m$. This decision can be made as a tentative decision based on a threshold value set in phase-domain or IQ-domain. It is assumed that the demodulator operates in a steady state wherein the decision can be made correctly.

Having provided the estimate, a phase error $\phi_m$ between the phase of the received symbol and the estimated, correct phase $\hat{\theta}_m$ can be calculated by means of an adder 907. This phase error is an error for the symbol m, and is consequently as noisy as the phase of the symbol. Therefore, this phase error is not suitable for maintaining a phase reference. Thus, a less fluctuating phase reference is created by means of a low-pass filter 908. Preferably, the low-pass filter implements the following time-domain transfer function: $\psi_m^{ref} = \psi_{m-1}^{ref} + (1-\alpha) \phi_m$ wherein the factor $(1-\alpha)$ determines the weight by which the present error influences the reference.

Returning to the input provided to the decision unit 904, via the adder 903, the phase value $\theta_m$ is compensated with the phase reference $\psi_{m-1}^{ref}$ provided by the low-pass filter 908.

Figure 10:
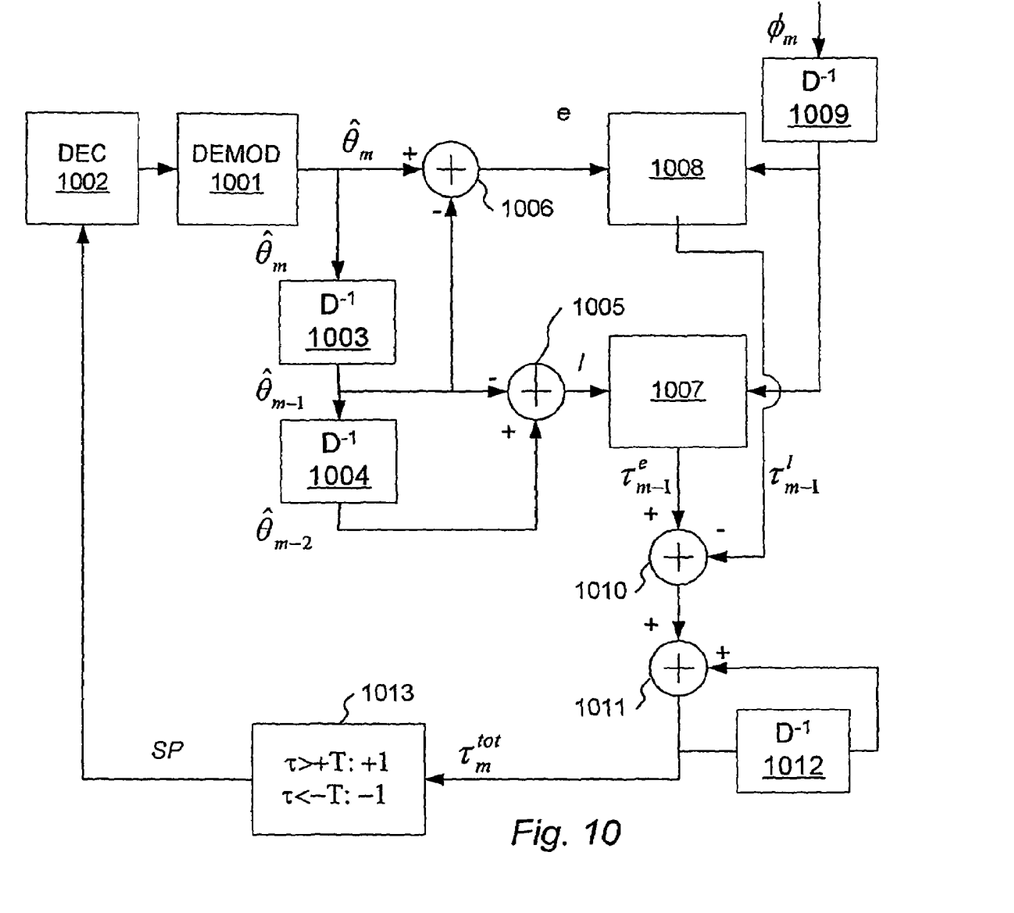
FIG. 10 shows a detailed block diagram of a semi-coherent demodulator according to the invention.

FIG. 10 shows a detailed block diagram of a semi-coherent demodulator according to the invention.

The demodulator comprises a demodulator 1001, e.g. as described above, that receives samples from a controllable decimator 1002. The demodulator provides the estimated phase $\hat{\theta}_m$ and the phase error $\phi_m$.

By means of delay elements 1003 and 1004 $\hat{\theta}_{m-1}$ and $\hat{\theta}_{m-2}$ is provided, respectively. Thereby the differences $\hat{\theta}_{m-2} - \hat{\theta}_{m-1}$ and $\hat{\theta}_m - \hat{\theta}_{m-1}$ can be provided by adders 1005 and 1006 to units 1007 and 1008, respectively. The units are calculation units that calculate the error metrics $\tau_{m-1}^e$ and $\tau_{m-1}^l$ based on which demodulation scheme the demodulator operates under and the phase error $\phi_m$ provided by delay element 1109. More specifically, the units implement the steps 8 and 9 of the working principle of the demodulator according to the invention.

The difference between the late and early error metric is provided by adder 1010 and the result thereof is provided to a further adder 1011 which together with delay element 1012 iteratively updates the total error metric. A decision of whether to update the sampling phase or not is taken by decision unit 1013, which controls decimator 1002.

In case the applied modulation scheme is $\pi/4$-rotated DQPSK the above algorithms are modified according to the below.

| Step | Expression |
|------|-----------|
| 1. | $\psi_m^{rot} = (\psi_{m-1}^{rot} + \pi/4) \bmod 2\pi$ |
| 2. | see $\pi/2$ DBPSK |
| 3. | $\hat{\theta}_m^{deret} = \begin{cases} 0: & |\theta_m^{derot}| < \pi/4 \\ \pi/2: & \pi/4 \leq \theta_m^{derot} < 3\pi/4 \\ \pi: & 3\pi/4 \leq \theta_m^{derot} < 5\pi/4 \\ -\pi/2: & \text{otherwise} \end{cases}$ |
| 4. | see $\pi/2$ DBPSK |
| 5. | see $\pi/2$ DBPSK |
| 6. | see $\pi/2$ DBPSK |
| 7. | $y_m = \theta_m - \hat{\theta}_{m-1} - \psi_{m-1}^{ref} - \pi/4$ |
| 8. | $\tau_{m-1}^e = \begin{cases} -\phi_{m-1}: \operatorname{sgn}(\hat{\theta}_{m-2} - \hat{\theta}_{m-1}) = -1 \\ \phi_{m-1}: \operatorname{sgn}(\hat{\theta}_{m-2} - \hat{\theta}_{m-1}) = 1 \end{cases}$ |
| 9. | $\tau_{m-1}^l = \begin{cases} -\phi_{m-1}: \operatorname{sgn}(\hat{\theta}_m - \hat{\theta}_{m-1}) = 1 \\ \phi_{m-1}: \operatorname{sgn}(\hat{\theta}_m - \hat{\theta}_{m-1}) = -1 \end{cases}$ |
| 10. | see $\pi/2$ DBPSK |
| 11. | see $\pi/2$ DBPSK |

In case the applied modulation scheme is non-rotated 8-DPSK the above algorithms are modified according to the below.

Non-rotated modulation has the effect on the algorithm for time tracking that the phases for two consecutive symbols $\theta_{m-1}$ and $\theta_m$, may be the same or that they might differ by $\pi$. Both of these cases cause a problem the present algorithm for time tracking in that the behaviour of the phase does not give much information. For this reason, the metrics will not be updated in case the phase shift between two consecutive symbols is either 0 or $\pi$. For 8-ary modulation, there are eight possible phase shifts between two symbols, so that on average 75% of the symbols are still used for time tracking. Below, the algorithm non-rotated 8-DPSK is given. Since it is somewhat awkward to let $\psi^{rot}=0$ throughout the algorithm, the notation is adapted accordingly and the superscript derot is dropped.

| Step | Expression |
|------|-----------|
| 1. | — |
| 2. | $\theta_m = \theta_m - \psi_{m-1}^{ref}$ |

-continued

| Step | Expression |
|------|------------|
| 3. | $\hat{\theta}_m = \begin{cases} 0: & |\theta_m| < \pi/8 \\ \pi/4: & \pi/8 \leq \theta_m < 3\pi/8 \\ \pi/2: & 3\pi/8 \leq \theta_m < 5\pi/8 \\ 3\pi/4: & 5\pi/8 \leq \theta_m < 7\pi/8 \\ \pi: & 7\pi/8 \leq \theta_m < 9\pi/8 \\ 5\pi/4: & 9\pi/8 \leq \theta_m < 11\pi/8 \\ 3\pi/2: & 11\pi/8 \leq \theta_m < 13\pi/8 \\ 7\pi/4: & \text{otherwise} \end{cases}$ |
| 4. | — |
| 5. | $\phi_m = \theta_m - \hat{\theta}_m - \psi^{ref}_{m-1}$ |
| 6. | $\psi^{ref}_m = \psi^{ref}_{m-1} + (1-\alpha)\phi_m$ |
| 7. | $y_m = \theta_m - \hat{\theta}_{m-1} - \psi^{ref}_{m-1}$ |
| 8. | $\tau^e_{m-1} = \begin{cases} -\phi_{m-1}: 0 > \hat{\theta}_{m-2} - \hat{\theta}_{m-1} > -\pi \\ \phi_m: 0 < \hat{\theta}_{m-2} - \hat{\theta}_{m-1} < \pi \end{cases}$ |
| 9. | $\tau^l_{m-1} = \begin{cases} \phi_{m-1}: 0 < \hat{\theta}_m - \hat{\theta}_{m-1} < \pi \\ \phi_m: 0 > \hat{\theta}_m - \hat{\theta}_{m-1} > -\pi \end{cases}$ |
| 10. | — |
| 11. | — |

It is noted that the above algorithms for π/4-rotated DQPSK and non-rotated 8-DPSK can be implemented in connection with the proposed algorithm for updating the sampling phase.

Generally, it should be emphasized that the invention works on signals in the IQ-domain as well as on signals in the phase domain.

The invention claimed is:

1. A signal processing apparatus comprising:
a demodulator arranged to demodulate a received signal, which carries consecutive symbols at a symbol rate, wherein the demodulator is arranged, based on sample values of the received signal, to calculate an error value of a given symbol relative to a decision-directed determination of an expected symbol value; and
a phase-shifter arranged to shift a phase of sampling points in time at which points in time, sample values of the received signal are provided to the demodulator; and
a processor arranged to evaluate an error metric, at the symbol rate, for a given symbol as a function of the error value and symbol values, and to determine whether to shift the phase of the sampling points in time based on further evaluation of the error metric;
wherein either the error metric is at least one of a function of the phase error value of a given symbol relative to the decision-directed determination of an expected symbol phase value, the phase value of a previous symbol, and the phase of a succeeding symbol; and a function of the phase error of the received symbol multiplied by a difference between the phase of a previous symbol and the phase of a succeeding symbol; or
the error metric includes a first term representing that the sampling phase is advanced in time and a second term representing that the sampling phase is delayed in time relative to an optimal sampling phase, wherein the first term is the phase error of the received symbol multiplied by the phase of a succeeding symbol, and the second term is the phase error of the received symbol multiplied by the phase of a preceding symbol; or
the error metric expresses Inter Symbol Interference based on an estimate, which is based on an estimated impulse response for a transmission channel over which the symbol is transmitted prior to being input to the signal processing apparatus.

2. A signal processing apparatus according to claim 1, wherein the error metric is a function of symbol values for symbols preceding and succeeding the given symbol.

3. A signal processing apparatus according to claim 1, wherein the error metric is a function of expected symbol values.

4. A signal processing apparatus according to claim 1, wherein the demodulator is configured as a Phase Shift Keying (PSK) demodulator or a Differential Phase Shift Keying (DPSK) demodulator.

5. A signal processing apparatus according to claim 1, wherein the demodulator is arranged to calculate a variable for time tracking based on an accumulated sum of the error metric.

6. A signal processing apparatus according to claim 5, wherein the processor is arranged to determine whether to shift the phase, based on the accumulated sum of the error metric.

7. A signal processing apparatus according to claim 1, wherein the apparatus comprises a sampler arranged to sample the signal at an over sampling ratio OSR, which provides OSR samples per symbol; and the phase-shifter is arranged to control which out of every N samples is to be provided to the demodulator.

8. A signal processing apparatus according to claim 1, wherein the demodulator is arranged to calculate the error value of a given symbol additionally, relative to a reference value and the reference value is calculated, based on a calculated error value of previously received symbols.

9. A mobile telephone comprising a signal processing apparatus as set forth in claim 1.

10. A method of processing a signal, comprising the steps of:
demodulating a received signal, which carries consecutive symbols at a symbol rate, and
based on sample values of the received signal, calculating an error value of a given symbol relative to a decision-directed determination of an expected symbol value; and
shifting the phase of sampling points in time; and
evaluating an error metric, at the symbol rate, for a given symbol as a function of the error value and symbol values, and
determining whether to shift the phase of the sampling points in time based on further evaluation of the error metric;
wherein the error metric is at least one of a function of the phase error value of a given symbol relative to the decision-directed determination of an expected symbol phase value, the phase value of a previous symbol, and the phase of a succeeding symbol; and a function of the phase error of the received symbol multiplied by a difference between the phase of a previous symbol and the phase of a succeeding symbol; or
the error metric includes a first term representing that the sampling phase is advanced in time and a second term representing that the sampling phase is delayed in time relative to an optimal sampling phase, wherein the first term is the phase error of the received symbol multiplied by the phase of a succeeding symbol, and the second term is the phase error of the received symbol multiplied by the phase of a preceding symbol; or the error metric expresses Inter Symbol Interference based on an estimate, which is based on an estimated impulse response for a transmission channel over which the symbol is transmitted prior to being input to the signal processing apparatus.

11. A method of processing a signal according to claim 10, wherein the error metric is a function of symbol values for symbols preceding and succeeding the given symbol.

12. A method of processing a signal according to claim 10, wherein the error metric is a function of expected symbol values.

13. A method of processing a signal according to claim 10, wherein the demodulation is Phase Shift Keying (PSK) demodulation or Differential Phase Shift Keying (DPSK) demodulation.

14. A method of processing a signal according to claim 10, wherein the demodulation comprises calculation of a variable for time tracking based on an accumulated sum of the error metric.

15. A method of processing a signal according to claim 14, wherein the evaluation comprises determination of whether to shift the phase, based on the variable for time tracking.

16. A method of processing a signal according to claim 10, further comprising the step of sampling the signal at an over sampling ratio OSR, which provides OSR samples per symbol; and the step of shifting the phase involves controlling which out of every N samples is to be provided for demodulation.

17. A method of processing a signal according to claim 10, wherein the demodulating includes calculating the error value of a given symbol relative to a reference value, and the reference value is calculated, based on a calculated error value of previously received symbols.

* * * * *